United States Patent [19]

Matsuno et al.

[11] Patent Number: 4,591,686

[45] Date of Patent: May 27, 1986

[54] FEEDER FOR REVOLVING ELECTRODE

[75] Inventors: Kenji Matsuno; Kazuma Kuse, both of Yokohama, Japan

[73] Assignee: Toyo Seikan Kaisha Limited, Tokyo, Japan

[21] Appl. No.: 607,112

[22] Filed: May 1, 1984

[30] Foreign Application Priority Data

May 9, 1983 [JP] Japan .................................. 58-79433
Aug. 5, 1983 [JP] Japan ................................. 58-142456

[51] Int. Cl.$^4$ ............................................. B23K 11/06
[52] U.S. Cl. ........................................ 219/81; 219/84
[58] Field of Search ....................... 219/81, 82, 63, 64, 219/83, 84

[56] References Cited

U.S. PATENT DOCUMENTS 2,280,111 4/1942 Widell ................................... 219/64
3,596,043 7/1971 Sporri ................................... 219/83
4,334,138 6/1982 Matsuno et al. ....................... 219/64

FOREIGN PATENT DOCUMENTS 2129244 1/1973 Fed. Rep. of Germany ........ 219/64

Primary Examiner—C. L. Albritton
Assistant Examiner—Catherine Sigda
Attorney, Agent, or Firm—Wenderoth, Lind & Ponack

[57] ABSTRACT

A device for feeding electric power to a roll-like revolving electrode in an electrical resistance welding machine includes a feeder rotor provided in a shaft formed integrally with a revolving electrode and a feeder plate extending in the moving direction of the revolving electrode and disposed in contact with the periphery of the feeder rotor. The periphery of the feeder rotor is electrically coupled to the electrode surface of the revolving electrode, and the feeder plate is connected to a power supply. Consequently, the electrode surface of the revolving electrode is electrically coupled to the power supply.

8 Claims, 10 Drawing Figures

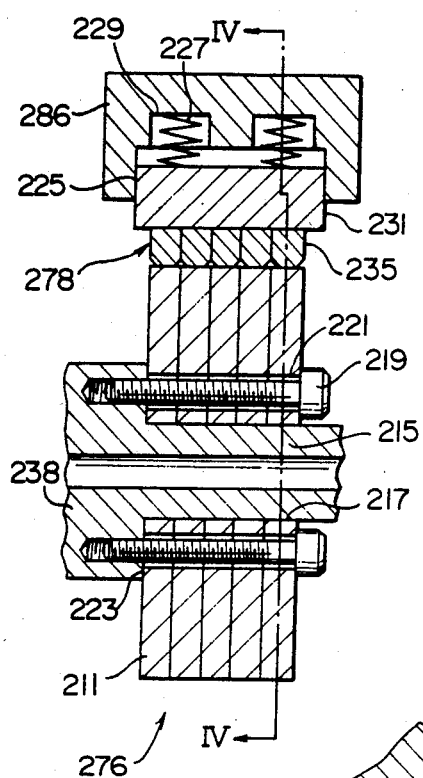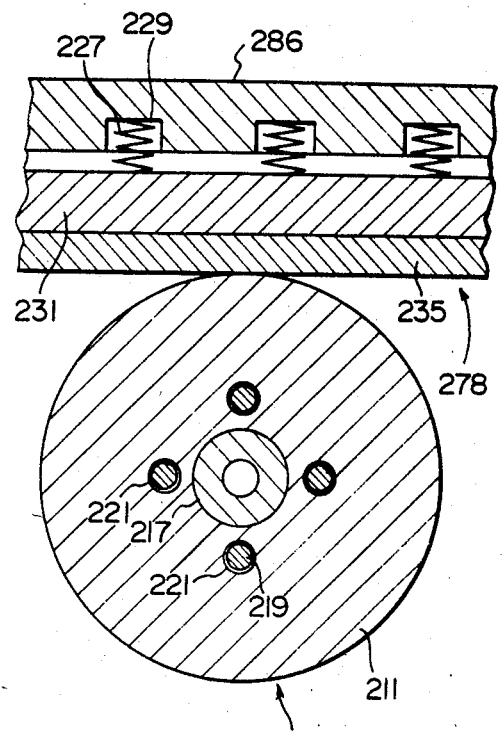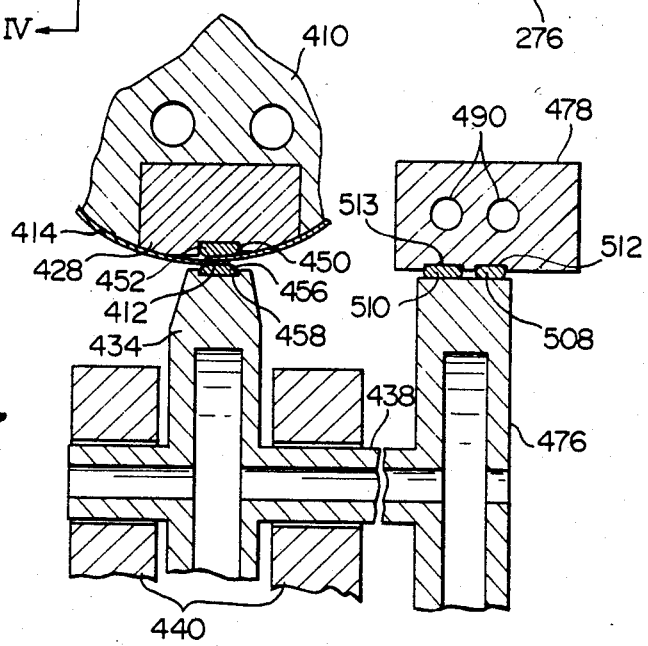

FEEDER FOR REVOLVING ELECTRODE

BACKGROUND OF THE INVENTION

1. Field of the Invention

This invention relates to a device for feeding electric power to a roll-like revolving electrode in a resistance welding machine.

The term "revolving electrode", as used herein, denotes a type of electrode which rotates while moving in a predetermined direction. It should be understood therefore that the terms "revolving" as a qualifier and "revolve" as a verb are used in this sense in the present specification and the appended claims.

2. Description of the Prior Art

Resistance welding machines including a revolving electrode have been widely known for welding metallic can bodies to make cans for holding aerosols, beer, powdery coffee, etc. and 18-liter cans.

In resistance welding machines of this type, a can body is welded by passing a relatively large electrical current through an elongate electrode and a revolving electrode that moves with rotation while the can body is being pressed between these electrodes. It is necessary for this purpose to couple both the elongate electrode and the revolving electrode to a power supply, and to move at least one of them relative to the power supply. It is the general practice in the conventional welding machines of this type to couple the power supply electrically to the revolving electrode using a flexible feeder line.

The conventional resistance welding machines, however, have various problems to be solved as described below.

Firstly, the feeder line undergoes marked wear. In these machines, the revolving electrode reciprocates longitudinally over a stroke corresponding to the sum of the welding length and the length required for acceleration and deceleration, and also moves vertically. The reciprocal movement of the revolving electrode deforms the flexible feeder line. In particular, when it reciprocates at a high speed or over a long stroke, the feeder line is worn out within a short period of time and cannot withstand use for a long time.

Secondly, heat generation is vigorous since the cross-sectional area and shape of the feeder line are restricted. The feeder line must be deformed according to the reciprocating motion of the revolving electrode. Hence, the feeder line must be slender and thin in its cross section. This shape of the feeder line leads to an increase in the electric resistance part of the impedance of the feeder line, and consequently heat generation in the feeder line increases. It is generally difficult, moreover, to cool such a deformable feeder line forcibly by such a means as water cooling.

Thirdly, the value of the electric current varies. If the flexible feeder line is deformed, the impedance of a circuit including the feeder line, particularly its inductance part, varies. As a result, the value of the current used for welding considerably varies depending upon the deformed condition of the feeder line and therefore proper positioning of the revolving electrode, and proper welding is difficult to perform.

Fourthly, it is difficult to pass a large electrical current through the feeder line. The aforesaid machines require a relatively large current for welding. However, since it is necessary to increase the distance between the feeder line and constituent members of the circuit, the inductance part of the impedance of the circuit increases, and it is difficult to pass a large electric current.

Fifthly, there is an increase in the load of the rectilinear reciprocating motion of the revolving electrode. In the aforesaid machines, the revolving electrode for its driving mechanism is connected to the feeder line through a bearing. Hence, the revolving electrode must be moved against the force of the feeder line to resist deformation, and this results in an increase in the load of the rectilinear reciprocating motion of the revolving electrode. Particularly, when the revolving electrode reciprocates at a high speed, the weight of the feeder line (the force of inertia) cannot be ignored.

SUMMARY OF THE INVENTION

It is an object of this invention therefore to provide a device for feeding an electric power to a roll-like revolving electrode, in which the amount of movement of a feeder line is very small.

Another object of this invention is to provide a device for feeding electric power to a roll-like revolving electrode, which can be used over a long period of time.

Still another object of this invention is to provide a device for feeding an electric power to a roll-like revolving electrode, in which the impedance value of the electric circuit is small and varies little during operation.

Yet another object of this invention is to provide a device for feeding electric power to a roll-like revolving electrode, in which the load of the reciprocating motion of the roll-like revolving electrode for its driving mechanism is low.

A further object of this invention is to provide a device for feeding electric power to a revolving electrode, which is free from the aforesaid problems of the prior art, and in which electrical transmission losses between a feeder rotor and a feeder plate are small.

An additional object of this invention is to provide a device for feeding electric power to a revolving electrode, which is free from the aforesaid problems of the prior art and has a relatively long service life.

The above and other objects of the invention will become apparent from the following description.

According to this invention, there is provided a device for feeding electric power to a roll-like revolving electrode in an electrical resistance welding machine, said device comprising a feeder rotor provided on a shaft formed integrally with a revolving rolling electrode and a feeder plate extending in the moving (rolling) direction of the revolving electrode and disposed in contact with the periphery of the feeder rotor, the periphery of said feeder rotor being electrically coupled to the electrode surface of the revolving electrode through said shaft, and said feeder plate being coupled to a power supply, whereby the electrode surface of the revolving electrode is electrically coupled to the power supply.

According to another aspect of this invention, there is provided a device for feeding an electric power to a roll-like revolving electrode in an electric resistance welding machine, said device comprising a feeder rotor provided on a shaft formed integrally with a rerolling electrode, a feeder plate extending in the moving (rolling) direction of the revolving electrode and disposed in contact with the periphery of the feeder rotor, and a wire electrode disposed between the feeder rotor and the feeder plate, the periphery of the feeder rotor being connected to the electrode surface of the revolving electrode through said shaft, said feeder plate being coupled to a power supply, and said feeder rotor being in press contact with said feeder plate through the wire electrode, whereby the electrode surface of the revolving electrode is electrically coupled to the power supply.

BRIEF DESCRIPTION OF THE DRAWINGS

FIG. 3 is a longitudinal sectional view showing a feeder rotor and a feeder plate that can be used in the feeder device of this invention;

FIG. 4 is a cross-sectional view taken along line IV—IV of FIG. 3;

FIG. 7 is an enlarged sectional view of the principal parts of the welding machine shown in FIG. 6;

DETAILED DESCRIPTION OF THE PREFERRED EMBODIMENTS

Figure 1:
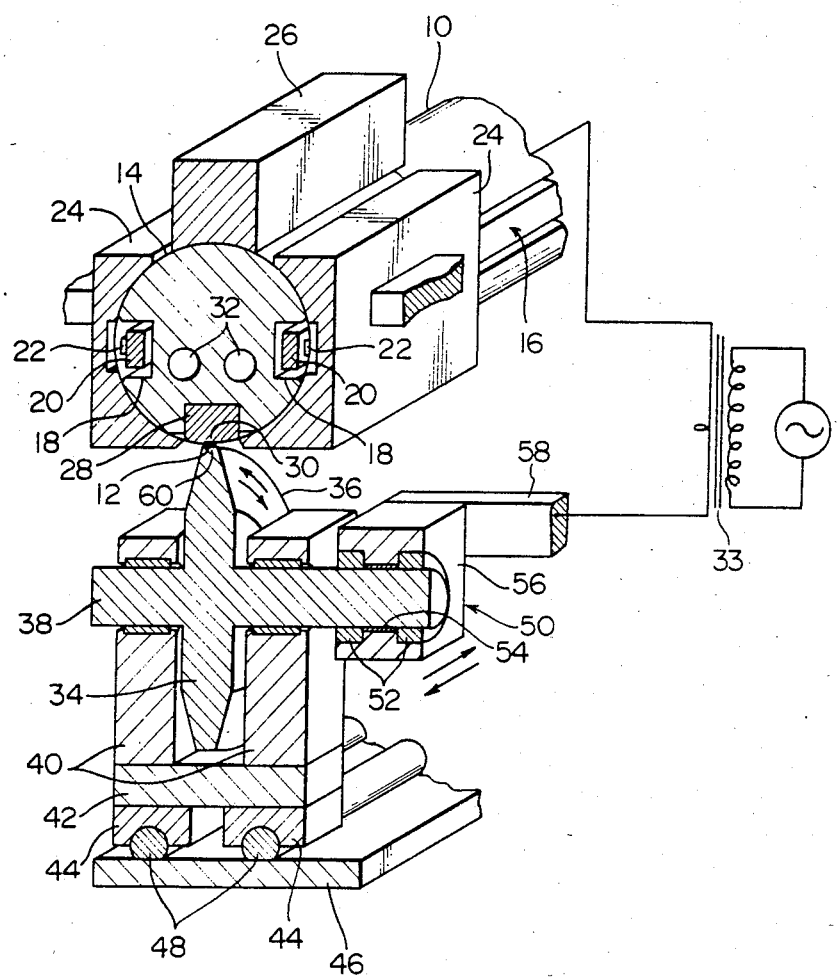
FIG. 1 is a partially sectional perspective view of a conventional mash seam resistance welding machine including a roll-like revolving electrode.

First, with reference to FIG. 1, a conventional mash seam resistance welding machine including a roll-like revolving electrode will be described.

A can body 14 is made with its lap portion 12 facing downwardly at a right rearward position of a mandrel 10, and the lap portion 12 is welded at a left forward position of the mandrel 10.

The can body 14 is conveyed on the mandrel 10 by a can body conveying mechanism 16 from a right rearward position toward a left forward position. The can body conveying mechanism 16 is comprised of can body feeding rods 20 disposed movably within longitudinally extending long channels 18 provided on the opposite sides of the mandrel 10, a plurality of spaced catches 22 provided in the can body feeding rods 20, and a driving mechanism (not shown). The catches 22 are adapted to come inwardly of the can body feeding rods 20 against a spring (not shown) when pressed from outside. The contacting end of each catch 22 has a proper inclined surface. When the can body feeding rods 20 move within the long channels 18 from the right rearward position toward the left forward position, the catches 22 engage the right rear end of the can body 14, and when the can body feeding rods 20 move from the left forward position toward the right rearward position, the inclined surfaces of the 22 contact the left front end of the can body 14 fixed as described below, and come inwardly of the can body.

A pair of holding wings 24 are disposed on both sides of a welding section which is located at a left forward part of the mandrel 10, and a supporting member 26 is disposed on the holding wings 24. These wings and the supporting member are adapted to move laterally and vertically by a cam mechanism (not shown) in synchronism with the driving mechanism for the can body feeding rods 20, so that they can press and fix the can body 14 against and to the mandrel 10 prior to welding.

An elongate electrode 28 is provided in the bottom groove of the mandrel 10. The electrode surface 30 of the elongate electrode 28 is made of a slender copper or copper alloy material which is at least longer than the length of the lap portion 12 (i.e., the height of the can body 14). The electrode surface 30 is a flat surface corresponding to the shape of the lap portion 12, or is bent slightly in a raised shape in its widthwise direction (approximately in the left-right direction in FIG. 1). When the lap portion 12 is not in a straight line in its longitudinal direction as when the can body 14 is barrel-like, the electrode surface 30 has a curved surface corresponding to the shape of the lap portion 12 in the longitudinal direction. The width of the electrode surface 30 is larger than the width of the lap portion 12, and usually, the electrode surface 30 is located on an extension of the circular body surface of the mandrel 10.

A cooling hole 32 is provided extending through the mandrel 10 so as to pass a cooling liquid such as cooling water, brine (at −30° C., for example) or liquefied Freon therethrough and to cool the elongate electrode 28, the can body 14, etc. fully for prevention of oxidation or wear.

The elongate electrode 28 is coupled to a welding power supply 33 (for example one having commercial frequencies, or in the case of high speed can production, a frequency of about 200 to about 500 Hz) by means of a feeder (not shown).

Beneath the elongate electrode 28 is disposed a revolving electrode 34 which in the illustrated device is roll-like. The electrode surface 36 of the revolving electrode 34 is in a short cylindrical form, and its width is larger than the width of the lap portion 12. As illustrated, a revolving electrode shaft 38 is formed integrally with the revolving electrode 34, and rotatably supported by two bearing plates 40. The two bearing plates 40 are fixed to the top surface of a supporting stand 42, and two rail receiving members 44 are fixed to the undersurface of the supporting stand 42. The rail receiving members 44 receive two rails 48 respectively fixed to a base stand 46. The rail receiving members 44 are constructed such that they can move longitudinally of the rails 48, but cannot in other directions. The base stand 46 makes a controlled vertically reciprocating motion by a driving mechanism (not shown). The supporting stand 42 makes a controlled longitudinal reciprocating motion along the rails 48 by a driving mechanism (not shown). As shown, a feeder bearing 50 is rotatably mounted on the shaft 38. The feeder bearing 50 has bearings (sealing members) 52 on the opposite ends of the feeder bearing 50, and an electrically conductive liquid 54 such as mercury or oil is sealed in between the bearings 52. As a result, the main body 56 of the feeder bearing 50 is always connected electrically to the shaft 38. A flexible feeder line 58 is connected to the main body 56 of the feeder bearing 50, and coupled to the power supply 33. Consequently, the power supply 33, feeder line 58, feeder bearing 50, shaft 38, revolving electrode 34, lap portion 12 of can body 14, elongate electrode 28 and power supply 33 are successively connected to each other electrically.

In operation, the can body 14 having the lap portion 12 facing downwardly is first formed rearwardly, and to the right, of the mandrel 10. The can body 14 is moved to a predetermined left forward position (the position shown in FIG. 1) by the feeding rods 20 and the catches 22. After the can body 14 has been moved to the predetermined position, the holding wings 24 and the supporting member 26 are moved from a position where they are relatively spaced from the mandrel 10 to a position where they press and fix the can body 14 against and to the mandrel 10. Initially, the revolving electrode 34 is positioned such that its top portion 60 is located at a longitudinal position slightly left of the left front end of the can body 14 held at the aforesaid predetermined position and at a vertical position slightly below the lap portion 12 of the can body 14. After the can body 14 has been positioned and fixed as above, the base stand 46 is moved upwardly by the driving mechanism to raise the top portion 60 of the revolving electrode 34. Consequently, the top portion 60 approaches the elongate electrode 28. Then, the supporting stand 42 is moved rearwardly to the right along the rails 48 by the driving mechanism. As a result of this movement, the revolving electrode 34 makes contact with the left front end of the lap portion 12 of the can body 14, whereupon an electric current begins to flow in the lap portion 12 and its welding is started. As the revolving electrode 34 moves rearwardly to the right, the revolving electrode 34 successively contacts the lap portion 12, and moves with rotation, namely revolves. The revolving electrode 34 reaches the right rear end of the lap portion 12, leaves the right rear end, and then moves slightly in the longitudinal direction. Thus, its longitudinal movement ends. Thereafter, the distance between the revolving electrode 34 and the elongate electrode 28 is increased by the driving mechanism for the base stand 46. The holding wings 24 and the supporting member 26 are returned to the position where they are relatively spaced from the mandrel 10. The can body 14 is further moved forwardly to the left by the feeding rods 20 and the catches 22 and detached from the mandrel 10. The above structure may be modified so that the welding of the lap portion 12 can be performed not only during the movement of the revolving electrode 34 from the left forward position to the right rearward position, but also during its movement in the reverse direction.

The aforesaid conventional apparatus is of such a structure that the power supply is electrically coupled to the revolving electrode by using the flexible feeder line 58, and therefore has the problems stated hereinabove.

Now, with reference to FIGS. 2 to 4, a welding machine including a feeder device in accordance with a first embodiment of the invention will be described.

A mandrel 110, a can body conveying mechanism 116, holding wings 124, a supporting member 126, etc. shown in FIG. 1 are the same as those shown in FIG. 1.

Figure 2:
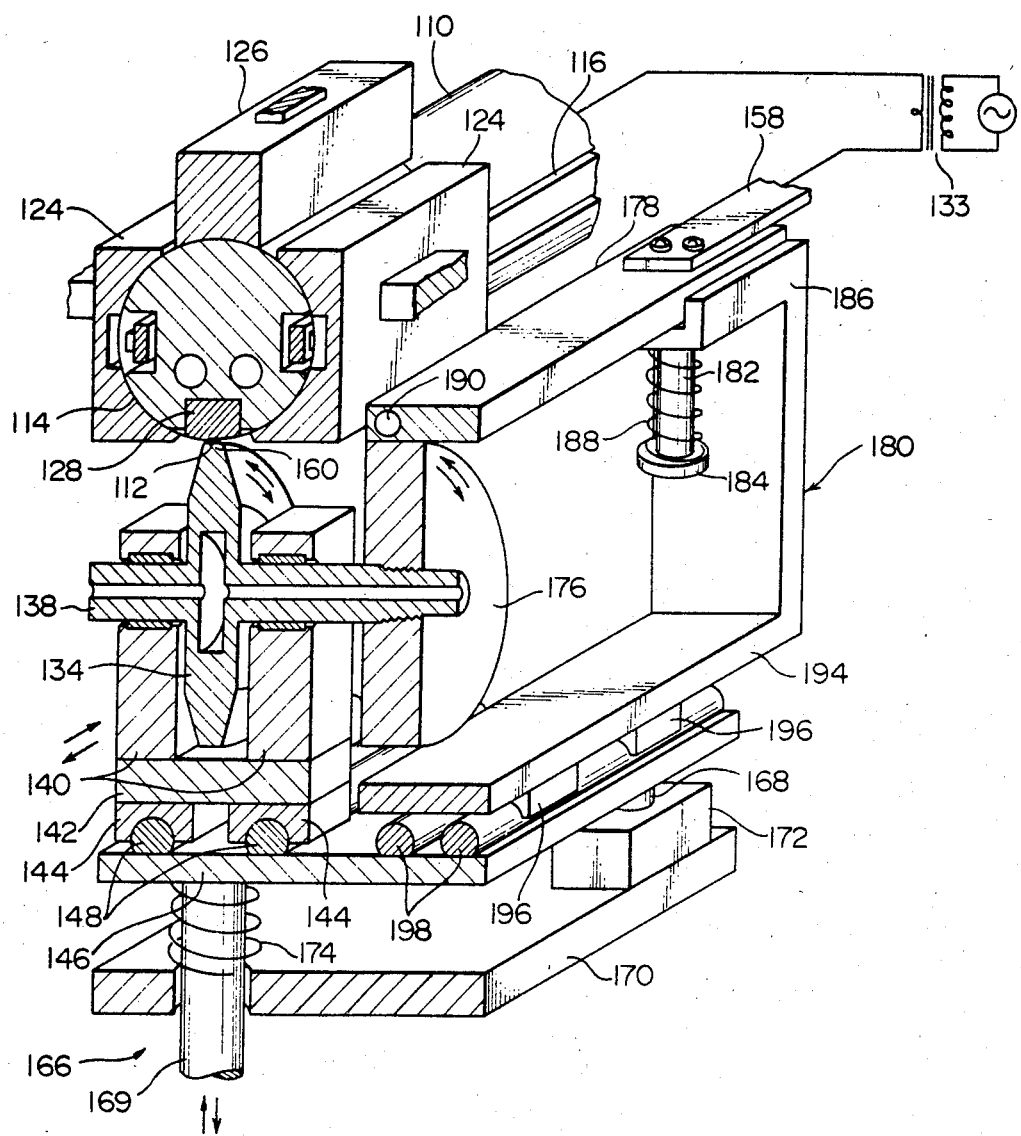
FIG. 2 is a partially sectional perspective view of a mash seam resistance welding machine equipped with a device for feeding electric power to a revolving electrode in accordance with a first embodiment of the invention.

In the welding machine shown in FIG. 2, too, a revolving electrode shaft 138 is integrally formed with a revolving electrode 134. The shaft 138 is rotatably supported by two bearing plates 140. The two bearing plates 140 are fixed to the top surface of a supporting stand 142, and two rail-receiving members 144 are fixed to the undersurface of the supporting stand 142. The rail-receiving members 144 respectively receive two rails 148 fixed to a base stand 146. The rail-receiving members 144 are adapted to move longitudinally of the rails 148 but not in other directions. The base stand 146 makes a controlled vertically reciprocating motion by a driving mechanism 166. The driving mechanism 166 is comprised of four vertically extending rods 168 fixed to the base stand 146, a sliding section 172 secured to a fixedly disposed frame 170, a vertically extending rod 169, and a spring 174 for pressurization during welding. The rods 168 are so disposed that they move only vertically within the sliding section 172. As a result, the base stand 146 is maintained horizontal during its vertical movement. The spring 174 for pressurization is disposed around the rod 169 and between the base stand 146 and the frame 170, and always pushes the base stand 146 upwardly. The lower end of the rod 169 is connected to a cam mechanism (not shown) whereby the base stand 146 makes a controlled vertically reciprocating motion. When the base stand 146 is elevated by the cam mechanism, the revolving electrode 134 comes into pressing contact with an elongate electrode 128 through a lap portion 112 of a can body 114 by the pushing force of the spring 174. The supporting stand 142 makes a controlled longitudinally reciprocating motion along the rails 148.

In the welding machine shown in FIG. 2, the revolving electrode 134 is electrically coupled to a power supply 133 by a feeder device as described below.

The feeder device includes a cylindrical feeder rotor 176 and a feeder plate 178.

The feeder rotor 176 is formed of a material having a low electrcal resistance such as copper or a copper alloy, and is fixed to the shaft 138. Thus, the feeder rotor 176 is always electrically coupled to the revolving electrode 134. Preferably, for the reason given below, the diameter of the feeder rotor 176 is equal to that of the revolving electrode 134.

The feeder plate 178 is mounted on a feeder plate support 180 so as to be movable only vertically with respect to the support 180. Specifically, a rod 182 is fixed to the right rear end portion of the feeder plate 178 as shown in FIG. 2. The lower end of the rod 182 has a protruding portion 184. The feeder plate 178 is fitted into a depressed portion of an upper plate 186 of the support 180. The rod 182 extends through a hole (not shown) formed in the upper plate 186. A compression spring 188 is disposed around the rod 182 and between the upper plate 186 of the support 180 and the protruding portion 184 of the rod 182. Although FIG. 2 shows only the right rear portion of the feeder plate 176, its left forward portion is similarly supported on an upper plate of the support 180 at the front left end of the feeder plate 178. Thus, application of an upwardly directed force to plate 178 causes it to rise against compression springs 188. The feeder plate 178 does not substantially move longitudinally and widthwise with respect to the support 180.

As shown, a hole 190 is formed in the feeder plate 178 so as to circulate a cooling liquid through it. Preferably, a similar hole is provided in the revolving electrode 134 and the shaft 138 so as to circulate a cooling liquid therethrough. One end of a feeder line 158 is connected to the right rear end of the feeder plate 178. The other end of the feeder line is connected to the power supply. For the reason given below, the feeder line 158 must be slightly deformable.

Four rail-receiving members 196 are fixed to the undersurface of a lower plate 194 of the support 180. Two rail-receiving members 196 receive each of two rails 198 fixed to the base stand 146. The rail-receiving members 196 are constructed such that they can move longitudinally of the rails 198 but not in other directions.

The operation of the device shown in FIG. 1 will be described.

As in the device shown in FIG. 1, the can body 114 is fixed at a predetermined position. Initially, the revolving electrode 134 is disposed such that its top portion 160 is located at a longitudinal position slightly to the left of the left front end of the can body 114 held at the predetermined position and a vertical position slightly downwardly of the lap portion 112 of the can body 114. In this condition, the feeder plate 178 is kept in pressing contact with the feeder rotor 176.

Then, the base stand 146 is moved upward by the driving mechanism therefor, and the top portion 160 of the revolving electrode 134 contacts the elongate electrode 128. At this time, the feeder rotor 176 also rises, but since the support 180 is provided on the base stand 146, the relative position of the feeder rotor 176 and the feeder plate 178 remains unchanged. As a result, the power supply 133, feeder line 158, feeder plate 178, feeder rotor 176, shaft 138, revolving electrode 134, elongate electrode 128 and power supply 133 are electrically connected successively.

Then, the supporting stand 142 supporting the revolving electrode 134 is moved rearwardly to the right along the rails 148 by the driving mechanism therefor. With this movement, the revolving electrode 134 in contact with the elongate electrode 128 starts to rotate, and simultaneously the feeder rotor 176 connected to the revolving electrode 134 via the shaft 138 starts to rotate.

When the revolving electrode 134 and the feeder rotor 176 are further moved, the revolving electrode 134 reaches the left front end of the lap portion 112 of the can body 114. A little before the revolving electrode 134 reaches the lap portion 112, or upon its arrival, a welding current is applied to the aforesaid circuit by a switch (not shown). When the revolving electrode 134 has reached the lap portion 112, a current flows from the power supply 133, passes through the feeder line 158, feeder plate 178, feeder rotor 176, shaft 138, revolving electrode 134, lap portion 112 of the can body, and elongate electrode 128, and flows back to the power supply 133, and welding of the lap portion 112 is started.

On further movement, the revolving electrode 134 and the feeder rotor 176 successively contact the lap portion 112 of the can body 114 and the feeder plate 178, and move while rotating, namely revolve. As a result, the lap portion 112 is successively welded. If the diameter of the revolving electrode 134 is equal to that of the feeder rotor 176, the feeder plate 178 and the support 180 are not moved longitudinally, and no slippage occurs between the revolving electrode 134 and the lap portion 112 and between the feeder rotor 176 and the feeder plate 178. Hence, the electrical coupling is not interrupted. Even when the revolving electrode 134 is designed such that its diameter is equal to the diameter of the feeder rotor 176, it is preferred to make the feeder plate 178 movable longitudinally by the structure shown in the drawings or by simply elastically supporting the feeder plate 178, so as to avoid slippage between the feeder rotor 176 and the feeder plate 178 over a long period of time.

On the other hand, to avoid slippage between the feeder rotor 176 and the feeder plate 178 during movement when the radius of the revolving electrode 134 differs from that of the feeder rotor 176, it is necessary to construct the feeder plate 178 such that it can move longitudinally.

The amount X of the longitudinal movement of the feeder plate 178 is represented by the following equation.

$$X = \frac{R_o - R}{R_o} S$$

$R_o$: the radius of the revolving electrode 134,
$R$: the radius of the feeder rotor 176,
$S$: the stroke of the revolving electrode in the welding direction (the longitudinal direction of the mandrel 110).

When the supporting member 142 is moved by stroke S in the longitudinal direction by the driving mechanism, the revolving electrode 134 moves rectilinearly by stroke S relative to the lap portion 112. During this time, the revolving electrode 134 rotates through angle $$W_o \left( = \frac{S}{R_o} \right),$$

and the feeder rotor 176 also rotates through angle $$W_o \left( = \frac{S}{R_o} \right).$$

If there is no slippage between the feeder rotor 176 and the feeder plate 178, this rotation causes the feeder rotor 176 and the feeder plate 178 to move rectilinearly relative to each other by distance $S' = W_o R$. The difference X between the amount S of the relative movement (stroke) of the revolving electrode 134 to the lap portion 112 and the amount S' of the relative movement of the feeder rotor 176 to the feeder plate 178

$$X = S - S' = \frac{R_o - R}{R_o} S$$

If the feeder plate 178 is moved by this difference X with respect to the lap portion 11 and therefore the support 180, to the base stand 146, no slippage occurs between the feeder rotor 176 and the feeder plate 178, and therefore, the electrical coupling is not interrupted. In the feeder device shown in FIG. 2, since the support 180 is adapted to move freely longitudinally with respect to the base stand 146, the support 180, and therefore the feeder plate 178, automatically moves longitudinally by the force of friction between the feeder rotor 176 and the feeder plate 178.

The lap portion 112 of the can body 114 is welded as described above. The revolving electrode 134 leaves the right rear end of the lap portion 112, and the welding is completed. The revolving electrode 134 is further moved rearwardly and to the right to some extent and then the space between the revolving electrode 134 and the elongate electrode 128 is broadened. The movement of the revolving electrode 134, etc. during this process is the same as that before the start of welding.

Removal of the welded can body 114 from the mandrel, the movement of the revolving electrode 134, etc. can be performed, for example, by the methods described hereinabove with reference to FIG. 1.

Preferred embodiments of the feeder rotor and the feeder plate used in the feeder device will now be described with reference to FIGS. 3 and 4.

The feeder rotor 276 is comprised of a plurality of disc-like rotor plates 211. Each of the rotor plates 211 has a central hole 217 for receiving the right side portion 215 (in FIG. 3) of the revolving electrode shaft 238 in a fitting relation, and a plurality of surrounding holes 221 for fitting bolts 219 therethrough. The position of the rotor plates 211 is set by the right side portion 215 and shoulder portion 223 of the revolving electrode shaft 238, and they are fixed detachably to the revolving electrode shaft by the bolts 219.

The feeder plate 278 shown in FIGS. 3 and 4 is disposed beneath an upper plate 286 of a feeder plate supporting member. The feeder plate supporting member is rectangular as a whole, and is comprised of a lower plate 194 (see FIG. 2), two upwardly extending side plates, and the upper plate 286 extending between the side plates. Formed in the upper plate 286 are a long channel 225 for receiving the feeder plate 278 therein and a plurality of depressed portions 229 formed within the long channel 225 for receiving springs 227 therein. The long channel 225 and the depressed portions 229 are opened downwardly as shown. Each of the springs 227 is disposed within the depressed portion 229 and between the upper plate 286 and the feeder plate 278, and always pushes the feeder plate 278 downwardly.

The feeder plate 278 is comprised of a feeder plate body 231 and a plurality of contact rails 235 fixed thereto. Preferably, the feeder plate body 231 is made of a relatively hard metal, such as hard copper, and the contact rails 235, of a relatively soft metal such as soft copper. This is because the soft nature of the contact rails 235 permits good electrical coupling between the feeder rotor 276 and the feeder plate 278.

The feeder plate 278 is coupled to a power supply by a feeder line (not shown).

The feeder rotors 276 and the feeder plate 278 shown in FIGS. 3 and 4 operate in the same way as the feeder rotor and the feeder plate shown in FIG. 2.

A welding machine in accordance with a second embodiment of this invention will be described with reference to FIG. 5.

Figure 5:
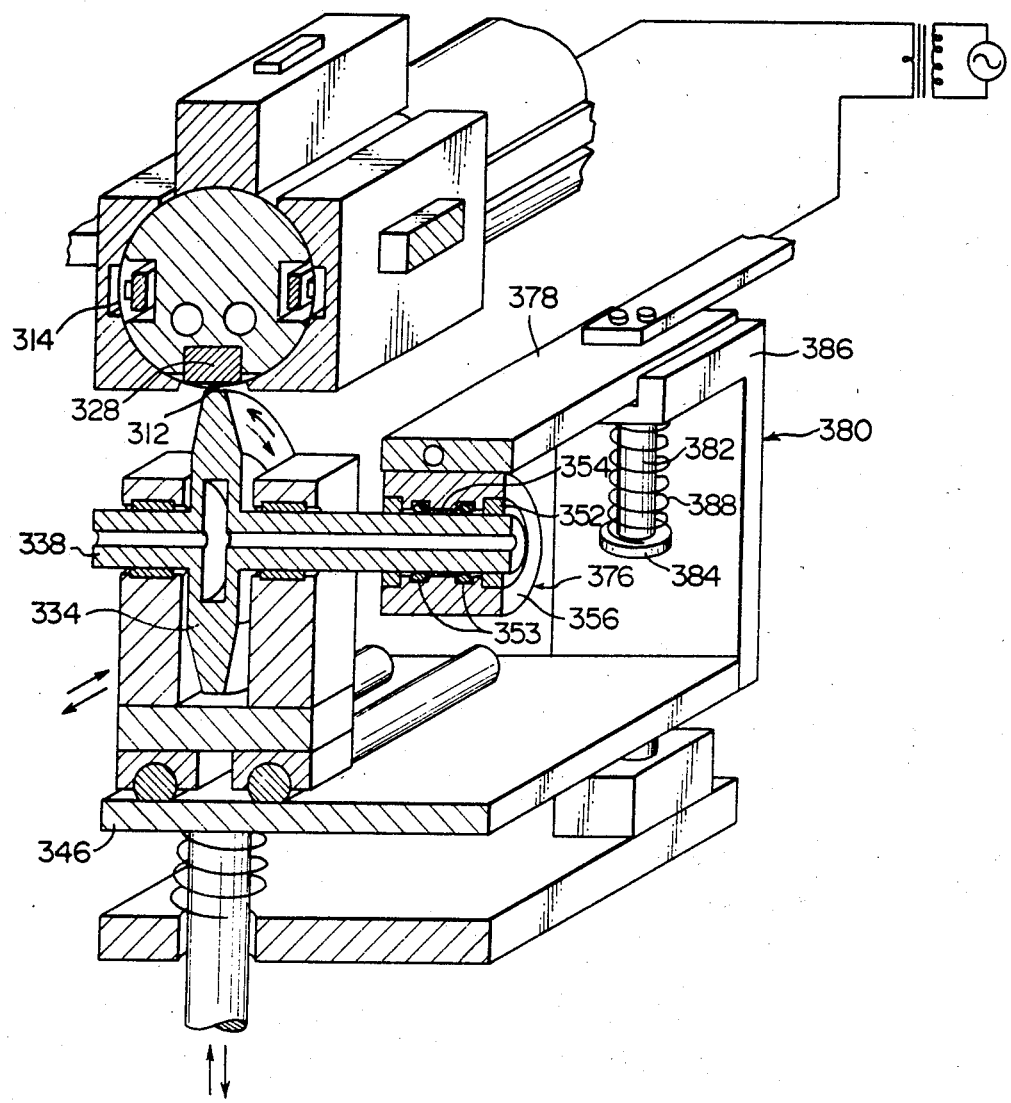
FIG. 5 is a partially sectional perspective view of a mash seam resistance welding machine equipped with a device for feeding an electric power to a revolving electrode in accordance with a second embodiment of the invention.

The welding machine shown in FIG. 5 is the same as that shown in FIG. 2 except for the device for feeding electric power to the revolving electrode 334.

The feeder device for the revolving electrode 334 of the welding machine shown in FIG. 5 includes a feeding bearing-type feeder rotor 376 and a feeder plate 378.

As shown, the feeder rotor 376 is secured to a revolving electrode shaft 338 and has a bearing 352 and a sealing material 353 at both ends. Between the sealing members 353 is sealed up an electrically conductive liquid 354 such as mercury or oil. Thus, the main body 356 of the feeder rotor 376 is always electrically coupled to the revolving electrode shaft 338. The feeder rotor 376 can rotate freely without being restricted by the rotation of the revolving electrode shaft 338.

The feeder plate 378 is secured to a feeder plate supporting member 380 so as to be movable only vertically. The upper plate 386, rod 382, protruding portion 384, compression spring 388, etc. of the supporting member 380 are the same as those shown in FIG. 2. The feeder plate supporting member 380 is directly fixed to a base stand 346, and the feeder plate 378 cannot move longitudinally.

The operation of the feeder device for the revolving electrode 338 shown in FIG. 5 will be described.

When the revolving electrode 334 begins to revolve on an elongate electrode 328 and a lap portion 312 of a can body 314, the feeder rotor 376 on the revolving electrode shaft 338 also revolves (rolls) over the feeder plate 378. At this time, the feeder plate 378 does not at all move in the rolling direction of the feeder rotor 376.

To avoid slippage between the feeder rotor 376 and the feeder plate 378 when the outside diameter of the revolving electrode 334 differs from that of the feeder rotor 376, it is necessary to provide a difference between the rotation of the feeder rotor 376 and that of the revolving electrode 334.

The number of rotations, N, of the feeder rotor 376 at this time is given by the following equation.

$$N = \frac{R_o}{R} N_o$$

R: the radius of the feeder rotor,
$R_o$: the radius of the revolving electrode 334,
$N_o$: the number of rotations of the revolving electrode.

If during the $N_o$ rotations of the feeder rotor 334, the feeder rotor 376 rotates through $R_o N_o/R$, the feeder rotor 376 and the feeder plate 378 do not slip with respect to each other. Hence, during this time, electrical coupling is maintained normal. Since in the feeder device shown in FIG. 5, the feeder rotor 376 is free to rotate, the feeder rotor 376 and the feeder plate 378 automatically rotate under the force of friction between them without slippage.

In the feeder devices of this invention in accordance with the first and second embodiments described above, the amount of movement of the feeder line caused by the movement of the roll-like revolving electrode is much smaller than in conventional feeder devices. Hence, the wear of the feeder line is reduced, and it can be used over an extended period of time. Furthermore, the crosssectional surface of the feeder portion can be increased, and a hole for circulation of a cooling liquid can be provided easily. Furthermore, the resistance part of the impedance of the welding current circuit can be easily decreased.

Since the elongate electrode and the roll-like revolving electrode can be arranged close to the feeding portion in the feeder devices in accordance with the first and second embodiments the inductance part of the impedance of the circuit can be decreased. Furthermore, the inductance part of the impedance varies little during operation because the relative position of the feeding portion to the elongate electrode and the revolving electrode does not so much vary. Consequently, welding can be carried out satisfactorily.

In the feeder devices of the invention in accordance with the first and second embodiments, the force of the feeder line to resist deformation is not applied directly as the load of the reciprocating motion of the revolving electrode for its driving mechanism, and the amount of deformation of the feeder line is small. Hence, the load of the reciprocating motion of the revolving electrode can be made smaller than in the prior art.

The feeder devices in accordance with the first and second embodiments of the invention have various advantages such as longer service lives and lesser heat generation than in the conventional devices. But these feeder devices have been found to have a problem still to be solved. The above feeder devices include a cylindrical feeder rotor and a feeder plate in contact with its periphery. If the feeder rotor and the feeder plate are made of a rigid material, they can be used over a long period of time. However, the area of contact between these members is small, and power transmission losses become undesirably great. On the other hand, when one or both of the feeder rotor and the feeder plate are made of a soft deformable material, the area of contact between these members increases and power transmission losses can be reduced. However, when made of a soft deformable material, these members cannot be used for an extended period of time.

Feeder devices in accordance with third to fifth embodiments of the invention successfully circumvent this new problem. These embodiments will be described below mainly with regard to the differences from the first and second embodiments.

First, with references to FIGS. 6 to 8, a mash seam resistance welding machine equipped with a device for feeding an electric power to the revolving electrode in accordance with the third embodiment of the invention will be described.

In this welding machine, an elongate electrode 428 is provided in the bottom channel of a mandrel 410. A lower guide channel 450 is formed in the bottom surface of the elongate electrode 428, and a first wire electrode 452 (FIG. 7) extends through the guide channel 450. An upper guide channel 454 for the first wire electrode 452 is formed on the upper surface of the mandrel 410. The first wire electrode 452 extends from the lower guide channel 450 to the upper guide groove 454 through a hole (not shown), and is moved longitudinally by a predetermined amount by a driving mechanism (not shown) when a roll-like revolving electrode 434 is at a position away from the elongate electrode 428.

The roll-like revolving electrode 434 is disposed below the elongate electrode 428. The outside circumferential surface of the revolving electrode 434 has formed therein a guide channel 458 for guiding a second wire electrode 456. The second wire electrode 456 is also moved in the same way as in the first wire electrode 452.

Integrally with the revolving electrode 434, a revolving electrode shaft 438 is formed as shown. The shaft 438 is rotatably supported by two bearing plates 440, The two bearing plates 440 are fixed to the upper surface of the supporting plate 442, and two rail-receiving members 444 are fixed to the lower surface of a supporting stand 442. The rail-receiving members 444 respectively receive two rails 448 fixed to a base stand 446. The rail-receiving members 444 are adapted to move longitudinally with respect to the rails 448 but not in any other direction. The base stand 446 makes a controlled vertically reciprocating motion by a driving mechanism 466. The driving mechanism 466 includes a vertically extending rod 468 fixed to the base stand 446, a sliding portion 472 fixed to a fixedly disposed frame 470, a vertically extending rod 468 fixed to the base stand 446, and a spring 474 for pressurization. The rod 468 is disposed so as to be able to move only in the vertical direction within the sliding portion 472. As a result, the base stand 446 is maintained horizontal during its vertical movement. The spring 474 is arranged around the rod 469 and between the base stand 446 and the frame 470, always pushes the base stand 446 upwardly. The lower end of the rod 469 is connected to a cam mechanism (not shown) so that the base stand 446 makes a controlled vertically reciprocating motion. When the base stand 446 is elevated by the cam mechanism, the revolving electrode 434 is adapted to come into press contact with the elongate electrode 428 through a lap portion 412 of a can body 414 by the pushing force of the spring 474. The supporting stand 442 makes a controlled longitudinally reciprocating motion along the rails 448 by a driving mechanism (not shown).

Figure 6:
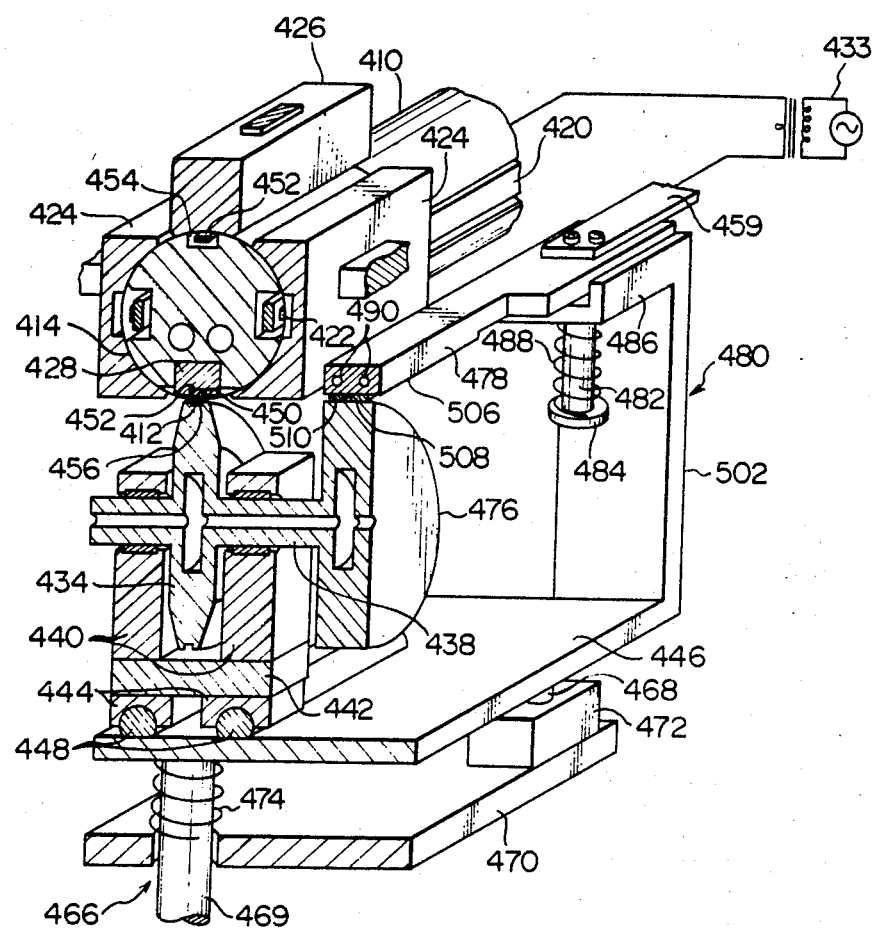
FIG. 6 is a partially sectional perspective view of a resistance welding machine equipped with a device for feeding an electric power to a revolving electrode in accordance with a third embodiment of this invention.
Figure 8:
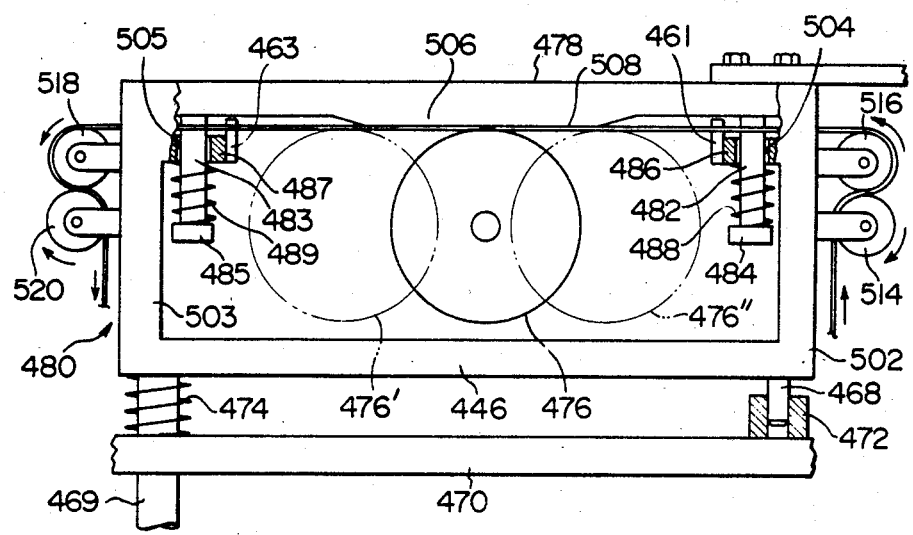
FIG. 8 is a side elevation, partly broken away, of the principal parts of the welding machine shown in FIG. 6.

In the welding machine shown in FIGS. 6 to 8, the revolving electrode 434 is electrically coupled to a power supply 433 by a feeder device to be described.

This feeder device is equipped with a feeder rotor 476 and a feeder plate 478.

The feeder rotor 476 is formed of a material having a low electric resistance such as copper or a copper alloy, and is fixed to the revolving electrode shaft 438, whereby the feeder rotor 476 and the revolving electrode 434 are always electrically coupled. Preferably, the diameter of the feeder rotor 476 is equal to that of the revolving electrode 434. If the diameter of the feeder rotor 476 is made equal to that of the revolving electrode 434, the feeder plate 478 can remain stationary without moving in the rolling direction when the feeder rotor 476 revolves.

On the other hand, when the diameter of the feeder rotor 476 is smaller than that of the revolving electrode 434, it is necessary to make the feeder plate 478 movable in the rotating direction during the rotation of the feeder rotor 476.

The feeder plate 478 is secured to a feeder plate supporting member 480 so as to be movable only vertically with respect thereto. As shown in FIG. 8, rods 482 and 483 are fixed to the feeder plate 478 nearly at their both ends in FIG. 7, and the lower ends of the rods 482 and 483 have protruding portions 484 and 485, respectively. The feeder plate 478 is fitted in depressed portions of upper plates 486 and 487 connected to the base plate 446 by side plates 502 and 503 of the supporting member 480. The rods 482 and 483 extend through holes 504 and 505 respectively formed in the upper plates 486 and 487. A compression spring 488 is disposed around the rod 482 and between the upper plate 486 of the supporting member 480 and the protruding portion 484 of the rod 482, and a compression spring 489 is likewise disposed around the rod 483 and between the upper plate 487 of the supporting member 480 and the protruding portion 485 of the rod 483. Thus, when an upwardly directed force is applied to the feeder plate 478, it can be elevated against the forces of the compression springs 488 and 489. The feeder plate 478 does not substantially move longitudinally and widthwise of the supporting member 480. The downward movement of the feeder plate 478 is restricted by stoppers 461 and 463 provided in the upper plates 486 and 487, respectively.

As shown in FIG. 7, a hole 490 is formed in the feeder plate 478 to circulate a cooling liquid therethrough.

Preferably, a similar hole is provided as shown in the revolving electrode 434 and its shaft 438 to circulate a cooling liquid therethrough. One end of a feeder line 459 is connected to the right rear end of the feeder plate 478, and the other end of the feeder line 459 is connected to a power supply 433. For the reason given below, the feeder line 459 needs to be slightly deformable.

The feeder plate 478 has formed a downwardly projecting flat portion extending 506 at its central portion in the longitudinal direction. Two guide channels 512 and 513 are formed in the flat portion 506 for guiding third and fourth wire electrodes 508 and 510 (FIG. 7). In the illustrated embodiment, the feeder rotor 476 has no channel for guiding the third and fourth wire electrodes 508 and 510. If desired, such a channel may be provided.

As shown in FIG. 8, first, second, third and fourth rollers 514, 516, 518 and 520 for guiding the third wire electrode 508 are rotatably supported on side plates 502 and 503 of the feeder plate supporting members 480. First, second, third and fourth rollers (not shown) for guiding the fourth wire electrode 510 (in FIG. 8) provided likewise. The third wire electrode 508 extends from a supply source (not shown) to below the feeder plate 478 via the first and second rollers 514 and 516, further advances nearly parallel to the feeder plate 478, is guided by the guide channel 512 of the flat portion 506 of the feeder plate 478, and reaches the third roller 518. It further extends downwardly via the fourth roller 520. During the welding operation, the third wire electrode 508 is adapted to be compressed by the feeder plate 478 and the feeder rotor 476 at its part being guided by the guide channel 512 of the flat portion 506 of the feeder plate 478.

The operation of the welding machine shown in FIGS. 6 to 8 will be described.

First, the can body 414 with its lap portion 412 directed downwardly is made rearwardly, and to the right, of the mandrel 410, and moved to a predetermined left forward position by feeding rods 420 and catches 422. After the can body 414 has been moved to the predetermined position, holding wings 424 and a supporting member 426 are moved from a position where they are comparatively spaced from the mandrel 410 to a position where the can body 414 is pressed and fixed against and to the mandrel 410. Initially, the revolving electrode 434 is positioned such that its top portion 460 is located at a longitudinal position slightly left of the left front end of the can body 414 held at the aforesaid predetermined position and a vertical position slightly downwardly of the lap portion 412 of the can body 414. At this time, the feeder rotor 476 exists at a position shown by a reference numeral 476' in FIG. 8 with respect to the feeder plate 478 of the feeder rotor 476. Specifically, the feeder rotor 476 is located slightly to the left of the flat portion 506 of the feeder plate 478 in FIG. 8, and the feeder plate 478 is supported by the stoppers 461 and 462. The third and fourth wire electrodes 508 and 510 can freely move longitudinally between the feeder rotor 476 and the feeder plate 476.

Thereafter, the base stand 446 is elevated slightly by a driving mechanism therefor comprising a rod 469, etc. Consequently, the revolving electrode 434 comes very close to the elongate electrode 428, or the revolving electrode 434 remains opposite to the elongate electrode 428 via the first wire electrode 456, the lap portion of the can body and the first wire electrode 452.

The feeder rotor 476 is supported on the base stand 446 via the bearing plates 440, etc. and the feeder plate 478 is also supported on the base stand 446 via the stoppers 461 and 463. Accordingly, even when the base stand 446 rises, the relative position of the feeder rotor 476 and the feeder plate 478 does not vary.

Then, the bearing plates 440 and the supporting stand 442 are moved along the rails 448. As a result, the feeder rotor 476 first faces the flat portion 506 of the feeder plate 478 via the third and fourth wire electrodes 508 and 510, and then the revolving electrode 434 faces the elongate electrode 428 via the second wire electrode 456, the left front end of the can body 414 in FIG. 6, and the first wire electrode 452. Consequently, one terminal of an ac power supply 433 is electrically coupled to the other terminal via the feeder line 459, the feeder plate 478, the third and fourth wire electrodes 508 and 510, the feeder rotor 476, the revolving electrode shaft 438, the revolving electrode 434, the second wire electrode 456, the can body 414, the first wire electrode 452 and the elongate electrode 428, and welding is started. By the movement of the bearing plate 440 and the supporting stand 442, the lap portion of the can body 414 is successively welded.

The revolving electrode 434 reaches the right rear end of the can body 414 in FIG. 6, and the welding is completed. Thereafter, the feeder rotor 476 leaves the flat portion 506 of the feeder plate 478, and reaches a position shown by a reference numeral 476" in FIG. 8. At this position, the third and fourth wire electrodes 508 and 510 can freely move between the feeder rotor 476 and the feeder plate 478.

In this embodiment, two wire electrodes 508 and 510 are disposed between the feeder rotor 476 and the feeder plate 478. Alternatively, only one wire electrode, or three or more wire electrodes may be provided as desired.

Pressure is exerted on the wire electrodes 508 and 510 between the feeder rotor 476 and the flat portion 506 of the feeder plate 478 to deform them to some extent. Consequently, the length of contact between the feeder rotors 476, the wire electrodes 508 and 510 and the feeder plate 478 in the advancing direction of the feeder rotor 476 can be increased, thus making it possible to increase the area of contact and reduce the contact resistance.

The wire electrodes 508 and 510 are produced by using a flexible material having good electric conductivity. As a specific example, products obtained by rolling into a flattened shape an electric mild copper wire or a low-melting metal-plated copper wire having a diameter of about 1.0 to 2.0 mm may be used as the wire electrodes 508 and 510. Examples of the low-melting metal are tin, lead and zinc.

When the wire electrodes 508 and 510 have the structure described above, the pressing force exerted on these wire electrodes by the feeder rotor 476 and the feeder plate 478 is 10 to 100 kg, preferably 15 to 50 kg, for each wire electrode.

With the welding machine shown in FIGS. 6 to 8, the welding is performed only when the revolving electrode 434 revolves from a left forward position to a right rearward position in FIG. 6, or both when it revolves from the left forward direction to the right rear direction and when it revolves from the right rear position to the left front position. In view of the mode of welding, the material of which the wire electrodes 508 and 510 are made, the aforesaid pressing force, etc., the wire electrodes 508 and 510 are moved by a driving device (not shown) when the feeder rotor 476 is at the left and right positions in FIG. 8, i.e. the positions shown at 478' and 478". The wire electrodes are replaced by new ones after use for 1 to several tens of times. Preferably, after completion of each welding cycle, the wire electrodes are moved a little.

Now, with reference to FIG. 9, a device for feeding electric power to the revolving electrode in accordance with the fourth embodiment of the invention will be described.

The following description mainly concerns the differences of the fourth embodiment from the third embodiment described above.

In the fourth embodiment, a stopper 663 is provided in a fixedly disposed frame 670 so that its vertical position can be adjusted. Specifically, an upwardly extending flange extension 671 is fixed to the frame 570. A rod-like stopper 663 is disposed extending through a hole in the flange 673 of the extension 671. The lower portion of the stopper 663 is threaded, and two nuts 675 threadedly received over the threaded portion hold the flange 673 therebetween.

Third and fourth rollers 618 and 620 are rotatably mounted on a feeder plate 678. The feeder plate 678 always undergoes a downwardly directed pushing force by a spring 689, and its lower position is restricted by the stopper 663. The feeder plate 678 can rise by a predetermined distance against the force of the spring 689. The feeder plate 678 has a flat portion 606 much longer than the length of the welding portion of a can body. In FIG. 9, only the left side stopper is shown, but a similar stopper exists on the right side.

Figure 9:
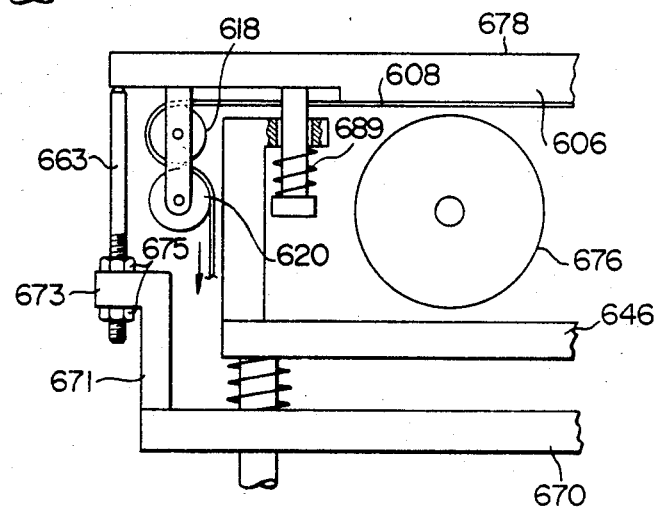
FIG. 9 is a side elevation, partly broken away, of a device for feeding an electric power to a revolving electrode in accordance with a fourth embodiment of this invention.

The fourth embodiment operates as follows:

First, as shown in FIG. 9, the base stand 646 is at a lowered position, and the feeder rotor 676, at the left side position. At this position, the revolving electrode (not shown) is positioned such that its top portion is located at a longitudinal position slightly left of the left front end of the can body (not shown) held at the predetermined position, and a vertical position slightly lower than the lap portion of the can body. The position of the feeder plate 678 is set by the stopper 663, and does not make contact with the feeder rotor 676.

Then, the base stand 646 is elevated. The feeder plate 678 whose position is set by the stopper 663 provided in the frame 670 does not rise initially. The feeder rotor 676 rises, contacts the feeder plate 678 via one or a plurality of wire electrodes 608. The feeder plate 678 is then raised against the spring 689.

Thereafter, the feeder rotor 676 is moved to the right in FIG. 9 together with the revolving electrode, etc., and the lap portion of the can body is welded.

After the welding operation, the base stand 646 is pushed downwardly as in the third embodiment. At this time, the feeder rotor 676 comes out of contact with the wire electrode 608 extending along the feeder plate 678.

When in the fourth embodiment described above, the feeder rotor 676 is at the left side position and the right side position, the base stand 646 is lowered, and the feeder rotor 676 does not face the wire electrode 608. In the above cases, the wire electrodes 608 can be moved a predetermined amount in the longitudinal direction by a driving device (not shown).

Figure 10:
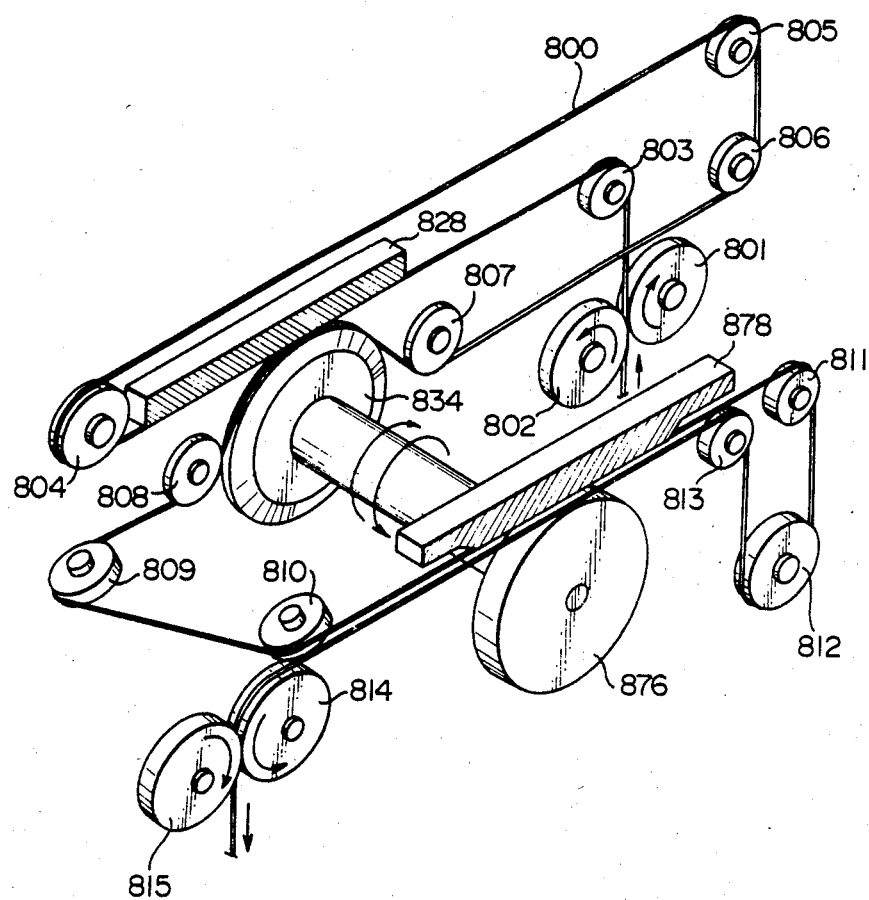
FIG. 10 is a simplified perspective view of the principal parts of a resistance welding machine equipped with a device for feeding an electric power to a revolving electrode in accordance with a fifth embodiment of this invention.

Now, with reference to FIG. 10, a resistance welding machine equipped with a device for feeding electric power to the revolving electrode in accordance with the fifth embodiment of this invention will be described.

The fifth embodiment has a feeder plate 878 and a stopper (not shown) similar to those in the fourth embodiment, but differs from the fourth embodiment in the mode of supplying the wire electrode.

In this embodiment, one wire electrode 800 is supplied from a supply source to a space between a first roller 801 and a second roller 802, proceeds to a third roller 803 above them, and advances along an elongate electrode 828. A channel may be provided in the elongate electrode 828 for guiding the wire electrode 800. The wire electrode 800 advances from the elongate electrode 828 above and parallel to the elongate electrode 828 via a fourth roller 804, for example along a channel provided in a mandrel (not shown), and finally reaches a fifth roller 805 and a sixth roller 806. The first to sixth rollers 801 to 806 are provided rotatably on fixedly provided members such as a mandrel or a rod. The wire electrode 800 extends further from the sixth roller 806, and reaches a seventh roller 807 moving together with a revolving electrode 834, while being rotatably supported, for example, on a bearing plate (not shown). It advances along the circumference of the revolving electrode 834, passes between the revolving electrode 834 and the elongate electrode 828, advances along the periphery of the revolving electrode 834, and reaches an eighth roller 808. Like the seventh roller, the eighth roller 808 is also adapted to move together with the revolving electrode 834. Then, the wire electrode 800 advances over the feeder rotor 876 along the flat portion of the feeder plate 878 via a ninth roller 809 and a tenth roller 810 provided rotatably on fixed members. The wire electrode 800 then advances from the feeder plate 878 via an eleventh roller 811, a twelfth roller 812 and a thirteenth roller 813, whereby its advancing direction is reversed and again it advances along the flat portion of the feeder plate 878, and finally discharged through a fourteenth roller 814 and a fifteenth roller 815. The ninth to fifteenth rollers are rotatably provided on fixed members. Various methods of driving the wire electrode 800 may be available. For example, it is possible to drive and thus longitudinally move the wire electrode 800 by connecting a drive motor to the first and second rollers 801 and 802 and the fourteenth and fifteenth rollers 814 and 815. As stated with regard to the fourth embodiment, the driving of the wire electrode 800 is effected when the feeder rotor 876 is away from the feeder plate 878. Since during this time the revolving electrode 834 and the elongate electrode 828 are spaced from each other, the driving of the wire elecrode 800 can be effected without resistance.

What is claimed is:

1. An electrical resistance welding machine for electrical resistance welding of an article to be welded between a revolving electrode and another electrode opposite thereto, comprising:

a revolving electrode having a cylindrical peripheral electrode surface and having an axial electrically conductive shaft integral therewith;

an other electrode opposite said revolving electrode for being electrically connected to one terminal of an electrical power supply;

means for rolling said revolving electrode in a rolling direction on the article to be welded with the article to be welded between said revolving electrode and said other electrode;

an electrically conductive feeder rotor mounted on said shaft so as to be in electrical contact, and be carried in said rolling direction therewith, having a cylindrical peripheral rotor surface radially spaced from and surrounding said shaft, electrically connected to said electrode surface through said shaft; and an electrically conductive feeder plate for being electrically connected to an other terminal of the electrical power supply, extending in said rolling direction, positioned so that said peripheral rotor surface rolls thereon in pressing electrical contact therewith in said rolling direction without substantial slip when said revolving electrode rolls on the article to be welded in said rolling direction, whereby the one and the other terminals of the power supply are electrically connectable through said feeder plate, said feeder rotor, said revolving electrode, the article to be welded and said other electrode, series connected to each other in the named order.

2. A machine as in claim 1, wherein the radius of the cylindrical peripheral surface of said feeder rotor is substantially equal to the radius of the cylindrical peripheral surface of said revolving electrode.

3. A machine as in claim 1, wherein said feeder plate is disposed so as to be moveable is said rolling direction of said revolving electrode.

4. A machine as in claim 1, wherein said other electrode is elongated in said rolling direction.

5. An electrical resistance welding machine for electrical resistance welding of an article to be welded between a revolvable electrode and another electrode opposite thereto, comprising:

a revolving electrode having a cylindrical peripheral electrode surface and having an axial electrically conductive shaft integral therewith;

an other electrode opposite said revolving electrode for being electrically connected to one terminal of an electrical power supply;

means for rolling said revolving electrode in a rolling direction on the article to be welded with the article to be welded between said revolvable electrode and said other electrode;

an electrically conductive feeder rotor mounted on said shaft so as to be in electrical contact, and be carried in said rolling direction therewith, having a peripheral rotor surface radially spaced from and surrounding said shaft, electrically connected to said electrode surface through said shaft; and an electrically conductive feeder plate for being electrically connected to an other terminal of the electrical power supply, extending in said rolling direction; and a wire electrode located between said feeder plate and said feeder rotor, said wire electrode and feeder plate being positioned so that said peripheral rotor surface rolls on said feeder plate in pressing electrical contact therewith through said wire electrode in said rolling direction without substantial slip when said revolving electrode rolls on the article to be welded in said rolling direction, whereby the one and the other terminals of the power supply are electrically connectable through said feeder plate, said wire electrode, said feeder rotor, said revolving electrode, the article to be welded and said other electrode, series connected to each other in the named order.

6. A machine as in claim 5, further comprising means, including a spring, for elastically urging said feeder plate in an engaging direction toward said feeder rotor, means, including a stopper engagable with said feeder plate, for limiting movement of said feeder plate toward said feeder rotor, and means for moving said feeder rotor between a first position in which said feeder rotor is close to said feeder plate such that said wire electrode is compressed between said feeder rotor and said feeder plate, and a second position in which said feeder rotor is away from said feeder plate such that said wire electrode is freely moveable between said feeder rotor and said feeder plate.

7. A machine as in claim 5, wherein said other electrode is elongated in said rolling direction.

8. A machine as in claim 7, wherein said wire electrode extends from between said feeder rotor and said feeder plate to between said rovolving electrode and said other electrode.

* * * * *